United States Patent
Vänttinen et al.

(10) Patent No.: US 7,126,940 B2
(45) Date of Patent: Oct. 24, 2006

(54) POSITIONING A SUBSCRIBER TERMINAL IN A PACKET-SWITCHED MOBILE TELEPHONE NETWORK

(75) Inventors: Veijo Vänttinen, Espoo (FI); Jussi Rajala, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 635 days.

(21) Appl. No.: 10/004,084

(22) Filed: Oct. 23, 2001

(65) Prior Publication Data

US 2002/0065086 A1 May 30, 2002

(30) Foreign Application Priority Data

Oct. 24, 2000 (FI) .................................. 20002337

(51) Int. Cl.
*H04L 12/66* (2006.01)

(52) U.S. Cl. ........................ 370/352; 370/357; 370/401; 455/456.1

(58) Field of Classification Search ................ 370/352, 370/353, 354, 355, 356, 357, 401; 455/456.1, 455/456.2, 456.5, 456.6, 457
See application file for complete search history.

(56) References Cited

U.S. PATENT DOCUMENTS

| | | | | |
|---|---|---|---|---|
| 6,222,483 B1 * | 4/2001 | Twitchell et al. | ....... | 342/357.09 |
| 6,560,457 B1 * | 5/2003 | Silver et al. | ................ | 455/445 |
| 6,606,501 B1 * | 8/2003 | Saha et al. | ............... | 455/456.1 |
| 6,608,832 B1 * | 8/2003 | Forslow | ....................... | 370/353 |
| 6,678,526 B1 * | 1/2004 | Sugirtharaj | .................. | 455/450 |
| 6,826,406 B1 * | 11/2004 | Vialen et al. | ................ | 455/450 |
| 7,064,706 B1 * | 6/2006 | King et al. | ............ | 342/357.02 |
| 2001/0009544 A1 | 7/2001 | Vanttinen et al. | ........... | 370/338 |
| 2002/0064164 A1 * | 5/2002 | Barany et al. | .............. | 370/401 |

FOREIGN PATENT DOCUMENTS

| | | |
|---|---|---|
| EP | 0841831 A2 | 5/1998 |
| WO | WO 99/63774 | 12/1999 |
| WO | WO 00/25545 | 5/2000 |
| WO | WO 00/76171 | 12/2000 |
| WO | WO 01/39442 | 5/2001 |
| WO | WO 01/56321 | 8/2001 |
| WO | WO 01/60094 | 8/2001 |

* cited by examiner

OTHER PUBLICATIONS

3GPP TS 43.059 v5.0.0, 2001, "3rd Generation Partnership Project; Technical Specification Group GSM/EDGE Radio Access Network; Functional Stage 2 Description of Location Services (LCS) in GERAN (Release 5)".

*Primary Examiner*—Hassan Kizou
*Assistant Examiner*—Jay P. Patel
(74) *Attorney, Agent, or Firm*—Perman & Green, LLP (57) ABSTRACT

The object of the invention is a method, network element, and system for positioning a subscriber terminal in a packet-switched mobile telephone network, the said network comprising a core network element (SGSN, 504), base stations, a Base Station Controller (501) controlling these, and a mobile terminal; the connections in the mobile telephone network are arranged in a packet-switched fashion. The system comprises a location unit (SMLC, 505) for determining the position of the terminal, functionally connected with the Base Station Controller (501) of the mobile telephone network; the connection between the Base Station Controller (501) and the location unit (SMLC) is circuit-switched. The base station controller (501) comprises both circuit-switched (BSC) and packet-switched (PCU) functionality for processing circuit-switched, and respectively, packet-switched messages, as well as means (506, 507) for establishing an association between the circuit-switched and the packet-switched functionality for the transmission of data related to a specific positioning between the packet-switched and the circuit-switched functionality.

25 Claims, 8 Drawing Sheets

POSITIONING A SUBSCRIBER TERMINAL IN A PACKET-SWITCHED MOBILE TELEPHONE NETWORK

FIELD OF THE INVENTION

The present invention relates to the positioning of a subscriber terminal in a packet-switched mobile telephone network.

BACKGROUND OF THE INVENTION

Positioning a subscriber terminal, that is, determining its geographical location, is an important feature in cellular radio networks. In the United States, FCC (Federal Communication Commission) requires that it must be possible to determine the position of any subscriber terminal initiating an emergency call with a resolution of 50 meters at the finest. The location information can also be utilised for commercial means, for example, for determining various tariff zones or implementing a navigation service for guiding the user. Location services (LCS) have thus far been developed primarily for applications in circuit-switched cellular radio networks such as the GSM system (Global System for Mobile Communications).

There are various methods for implementing the location service. On the coarsest level, the position of the subscriber terminal can be determined by the identity of the cell serving it. This information is not very accurate, as the cell diameter can be tens of kilometers.

A more accurate result can be obtained by utilising timing information of the radio connection, for example Timing Advance (TA), as supplementary information. In the GSM system, TA will indicate the position of the subscriber terminal at a resolution of approximately 550 meters. The problem is that if the cell uses an omnidirectional antenna, the position of the subscriber terminal can only be determined as being on a certain perimeter drawn around the base station. A base station with three separate sectors will make the situation slightly better, but even in this case, the position of the subscriber terminal can only be determined as being inside a sector 120 degrees wide and 550 meters deep at a certain distance from the base station.

Even these inaccurate methods are adequate for some applications, for example, determination of tariff zones. In addition, more accurate methods have been developed. Usually, these methods are based on several different base stations making measurements of signals transmitted by the subscriber terminal, an example being the TOA method (Time of Arrival).

The subscriber terminal can also make measurements of the signals transmitted by a number of base stations, an example of such a method being the E-OTD method (Enhanced Observed Time Difference). In synchronised networks, the subscriber terminal can measure the interrelations between the moments of reception of signals from various base stations. In non-synchronised networks, the signals sent by the base stations are also received at a Location Measurement Unit (LMU), sited at a known fixed point. The location of the subscriber terminal will be determined from the geometrical components calculated from the time delays.

Another method for determining the position is to use a GPS (Global Positioning System) receiver fitted into the subscriber terminal. The GPS receiver will receive signals from at least four satellites orbiting the Earth; from these signals, it is possible to calculate/determine the latitude, longitude and altitude of the subscriber terminal. The subscriber terminal can either determine its position independently, or it can be assisted. The network component of the radio system can send the subscriber terminal an assisting message to make positioning quicker and thus reduce the power consumption of the subscriber terminal. The assisting message may contain the time of day, a list of visible satellites, the Doppler phase of the satellite signal, and the search window for the code phase. The subscriber terminal may send the received information to the network component that will then perform the actual calculation/determination of position.

In this application, the network component of a radio system means the fixed part of the radio system, that is, either the whole system excluding the subscriber terminal, or a specified element of the network (that is, not all network functions require all elements of the network, and thus the word 'network' can also refer to an operation performed by a single element of the network). Therefore, the network component comprises network elements communicating with each other in various ways.

PRIOR ART

Previously known methods for positioning a network component, such as those used in the circuit-switched GSM system, utilise the SMLC (Serving Mobile Location Center) network element; the communication between network elements required for the positioning is conducted by means of signalling messages both in the data link layer and in higher layers. Thus, the SMLC network element will perform the actual positioning calculations/determination by request.

In the case of either a Mobile Originated Location Request (MO-LR) or a Mobile Terminated Location Request (MTLR), the latter originated by an external client, two SCCP (Signalling Connection Control Part) connections will be opened to access the functionality at the network level; SCCP includes provisions for exchanging messages required for determining the location. One SCCP will be between the MSC (Mobile Switching Center) and the BSC (Base Station Controller), and another SCCP will be between the BSC and the SMLC (Serving Mobile Location Centre) in use. The SCCP connection is of the type known as connection-oriented. Each SCCP connection has its own identifier (SCCP Connection ID) that can be used to establish an association.

After opening these two SCCP connections, it is possible to pass a location request to the SMLC; the BSC will forward the positioning messages between the mobile terminal and SMLC over the radio interface. The same connection can also be used to pass BSSLAP (Base Station Subsystem Link Access Protocol) messages between the SMLC and the base station serving the subscriber. Because it is the responsibility of the Base Station Controller (BSC) to direct the connections to the correct Mobile Station (MS), the messages in the said higher layers need not include any information about the connections nor any terminal identification data.

It is not possible to use above presented method in a packet-switched network, because there is no means to utilise circuit-switched signalling. For example, there is no SCCP connection to be used for this purpose. In packet-switched networks, information identifying the third-layer connection must thus be included in the message. For example, the so-called TLLI (Temporary Logical Link Identity) can be included in messages in the third layer or in higher layers. The same TLLI is also used in the RLC/MAC (Radio Link Control/Media Access Control) protocol in the radio connection.

The problem is the communication between the BSC and the SMLC, the latter having an Lb interface, and how to make the Lb interface support packet-switched communications. The difficult part is how to establish signalling between three parties: the SMLC, the MS and the SGSN (Serving GPRS Support Node). The SGSN is known from the GPRS (General Packet Radio Service) system. A specific difficulty is that the PCU (Packet Control Unit) is not able to associate communications through the Lb interface with the communications of a specified terminal.

In packet-switched radio systems, such as GPRS or EGPRS (Enhanced General Packet Radio Service), not much attention has been paid so far to the implementation of the location service. EGPRS is a GSM (Global System for Mobile Communications) based system utilizing packet-switched communications. EGPRS utilises EDGE (Enhanced Data Rates for GSM Evolution) technology to increase the communications capacity. In addition to the GMSK (Gaussian Minimum Shift Keying) modulation normally used with GSM, it is possible to use 8-PSK (8-Phase Shift Keying) modulation for the packet data channels. The primary target is the implementation of non-real-time data communications services such as file copying and Internet browsing, but also real-time packet-switched services for speech and video transmission, for example, can be implemented.

To transfer the information required by the positioning methods described above, packet-switched radio systems require a packet-switched transmission channel (using a so-called connectionless protocol) to be established between the core network of the radio system (such as the SGSN) and the subscriber terminal MS. So, the core network requests the radio network of the radio system (such as the BSC) to open the connection. The signalling required is relatively heavy and slow. Nevertheless, in time-critical applications it would be important to quickly get the location of the subscriber terminal from the location service.

THE PRESENT INVENTION

The idea of the present invention is to utilise both packet-switched (connectionless) and circuit-switched (connection-oriented) communications between the appropriate network elements for positioning a subscriber terminal in a packet-switched network. Particularly the idea of the invention is to use a circuit-switched connection between the Base Station Controller and the Serving Mobile Location Centre, and a packet-switched connection between other network elements. In the invention, an association between the packet-switched and circuit-switched functionality is established in the Base Station Controller.

In a preferred embodiment of the invention, the said association can be implemented by establishing an association between the packet-switched and circuit-switched messages, or, for example, by establishing an association between the packet-switched and circuit-switched protocol layers. Furthermore, in an embodiment of the invention, the association can be established as a table associating the packet-switched message identifier with the circuit-switched message identifier.

An embodiment of the invention utilises signalling based on the SS7 protocol between the BSC and the SMLC. The CCITT SS7 (Signalling System 7) protocol is a signalling protocol widely used by telecommunications operators; signalling between network elements is carried by protocol layers on a specific signalling channel. The protocol layers used are highly uniform, in accordance with the general-purpose 7-layer protocol model.

According to a first aspect of the invention, there is implemented a method for positioning a subscriber terminal in a packet-switched mobile telephone network, wherein for positioning the terminal a message is passed via the base station controller of the mobile telephone network; and it is characteristic of the method that for implementing the communications required for the positioning, both circuit-switched and packet-switched messages are used; an association is established between these messages for transferring data related to a certain positioning between packet-switched and circuit-switched functionality.

According to the method, it is possible to perform positioning in a packet-switched network by utilizing a circuit-switched location server. A benefit of the method is that SS7 protocol signalling can be utilised for packet-switched positioning and that this signalling will stay unmodified compared with the signalling used in present-day circuit-switched positioning (because the extra information needed for positioning is transmitted in the transport layer), so that positioning in a packet-switched network can be implemented using a location centre from a (old) circuit-switched network (using SS7 signalling).

According to a second aspect of the invention, there is presented a system for positioning a subscriber terminal in a packet-switched mobile telephone network, said network comprising a core network element, base stations, a base station controller controlling the base stations, and a mobile terminal of the mobile telephone network; and the connections in the mobile telephone network are arranged in a packet-switched fashion, and it is characteristic of the system that it comprises a location unit for determining the position of the terminal, functionally connected with the base station controller of the mobile telephone network, and that the connection between the base station controller and the location unit is circuit-switched, and the said base station controller comprises both circuit-switched and packet-switched functionality for processing circuit-switched and, respectively, packet-switched messages, means for establishing an association between the circuit-switched and the packet-switched functionality for the transmission of data related to a specific positioning between the packet-switched and the circuit-switched functionality.

The invention is suited for positioning for example in a GSM-based packet-switched GPRS or EGPRS radio system utilizing a GERAN (GSM EDGE Radio Access Network) base station controller.

According to a third aspect of the invention, there is implemented a network element for a packet-switched mobile communications system, the said element comprising means for implementing packet-switched functionality for processing packet-switched messages; it is characteristic of the network element that it comprises means for implementing circuit-switched functionality for processing circuit-switched messages, and means for establishing an association between the circuit-switched and the packet-switched functionality for the transmission of data related to a specific communication between the packet-switched and the circuit-switched functionality.

The preferred embodiments of the invention are the subject of non-independent patent claims.

A method and system according to the invention have the following benefits. It is possible to avoid using different device for implementing a packet-switched location service. Additionally, according to the invention, no large modifications to existing device are required, and signalling in the network becomes more uniform, and a relatively fast location service is achieved that can be implemented in the current packet-switched network in a relatively quick and, for the network operator, relatively cost-efficient way. The location service becomes faster when in certain cases, no specific packet data connection needs to be opened between the terminal and the location centre.

The method according to the invention makes it possible to implement location services in a GERAN (GSM EDGE Radio Access Network) system by utilizing the Lb interface in a way suitable for packet switching and by implementing protocol stacks suitable for packet switching in the BSC and SMLC network components of the GERAN system.

SHORT DESCRIPTION OF THE DRAWINGS

In the following, the invention will be discussed in more detail together with the preferred embodiments by referring to the enclosed drawings, of which

DETAILED DESCRIPTION OF INVENTION

Figure 1A:
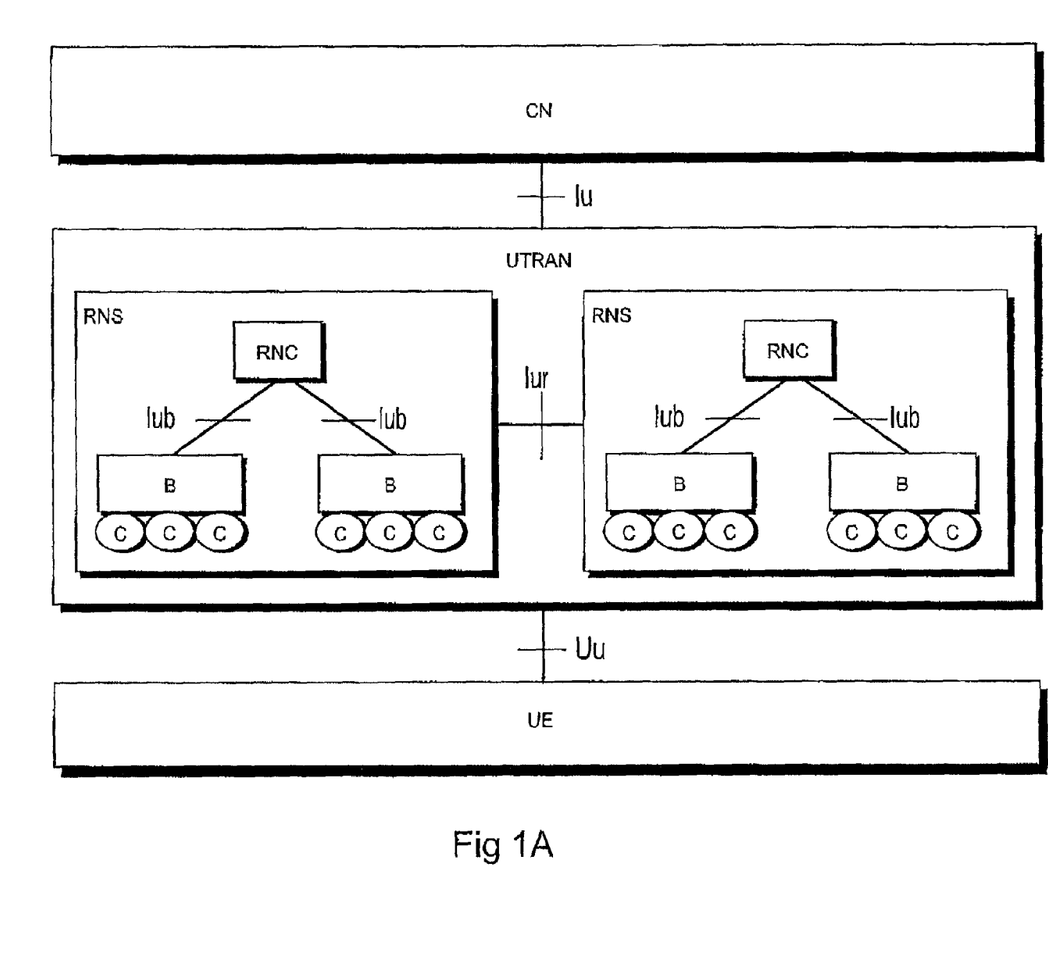
FIG. 1A shows an example of the structure of a cellular network.
Figure 1B:
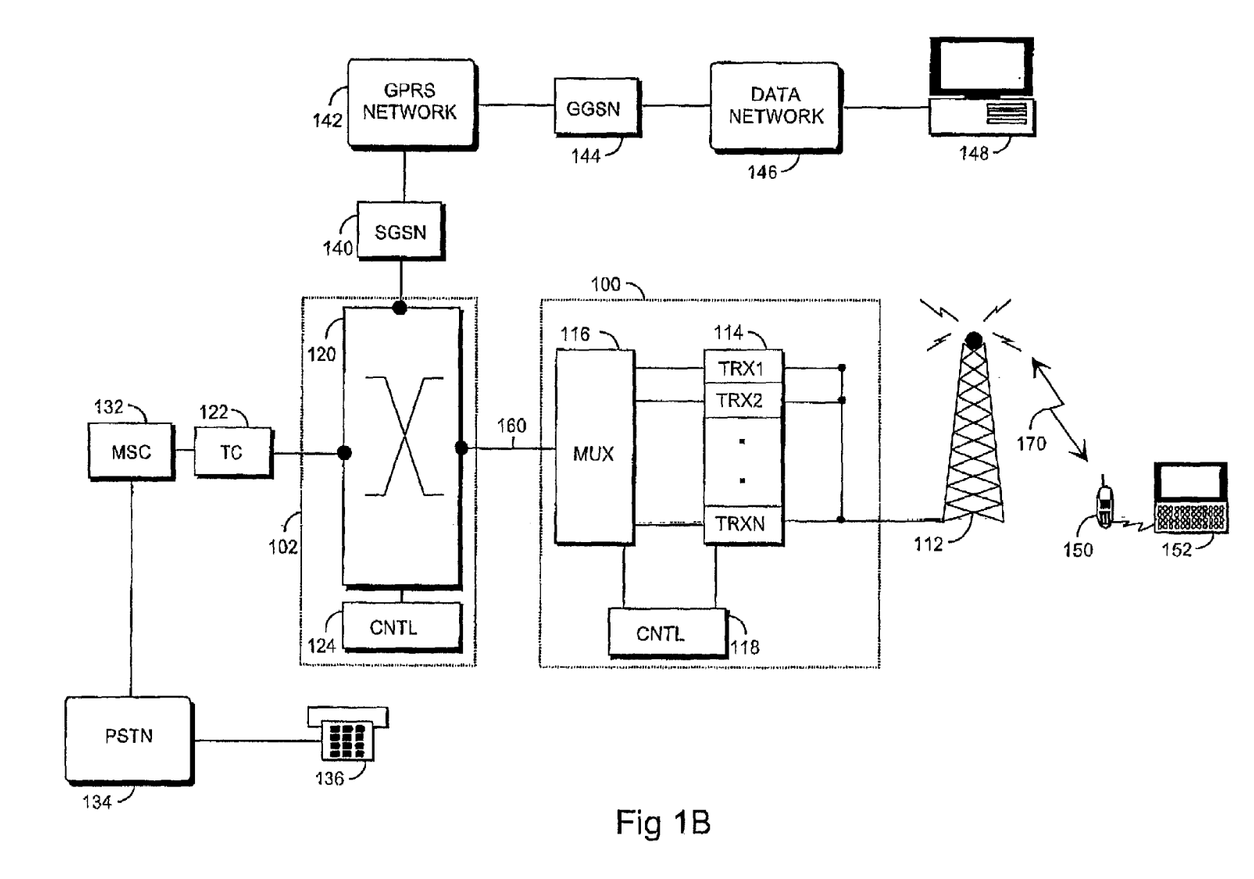
FIG. 1B shows a more detailed block diagram of a cellular network.

Referring to FIGS. 1A and 1B, a typical structure of a packet-switched radio system, together with its interfaces to the fixed telephone network and the packet transmission network, will be described. FIG. 1B only contains the blocks essential to the description of the embodiments, but it is clear to a person skilled in the art that a typical packet-switched cellular radio network also comprises other functions and structures whose detailed description is not required here. The radio system can be, for example, a GSM-based GPRS or EGPRS, a Universal Mobile Telephone System UMTS utilizing Wideband Code Division Multiple Access, or a hybrid of these systems, where the structure of the network is outlined in the UMTS style and the radio network is called GERAN (GSM Enhanced Radio Access Network), where the radio interface is nevertheless a normal GSM-based radio interface, or a radio interface utilizing EDGE modulation.

The description of FIGS. 1A and 1B is mainly based on UMTS. The main components of the mobile telephone system are the Core Network CN, the UMTS Terrestrial Radio Access Network, also known as the Radio Network UTRAN, and the subscriber terminal, also known as the User Equipment UE. The interface between CN and UTRAN is called Iu, and the air interface between UTRAN and UE is called Uu.

UTRAN is comprised of Radio Network Subsystems RNS. The interface between RNS's is called Iur. RNS is comprised of a Radio Network Controller RNC as well as one or more Node B's. The interface between RNC and B is called Iub. The range of Node B, also known as the cell, is marked in FIG. 1A by the letter C. RNS can also be called Base Station Subsystem (BSS), a more traditional term. So, the network component of the radio system comprises the radio network UTRAN and the core network CN.

The description in FIG. 1A is on a very general level, so it will be clarified further in FIG. 1B by showing the components of the GSM system that roughly correspond to each component of the UMTS system. It should be noted that the description shown here is by no means binding, but rather suggestive, because the responsibilities and functions of the various UMTS components are still in the design stage.

The subscriber terminal 150 can be, for example, a fixed terminal, a terminal fitted to a vehicle, or a portable terminal. The radio network infrastructure UTRAN is comprised of Radio Network Subsystems RNS, also known as Base Station Systems. The Radio Network Subsystem RNS is comprised of a Radio Network Controller RNC, also known as the Base Station Controller 102, and at least one Node B, also known as Base Station 100, operating under the control of the RNC.

The Base Station 100 comprises a multiplexer 116, several transceivers 114, and a control unit 118, controlling the operation of transceivers 114 and multiplexer 116. The multiplexer 116 is used to place the traffic and control channels used by several transceivers 114 into the transmission channel 160.

The transceivers 114 in the base station 100 are connected to the antenna unit 112 which is used for implementing a two-way radio connection Uu to the subscriber terminal 150. The structure of frames transmitted on the two-way radio connection Uu is accurately defined.

The base station controller RNC (reference 102) comprises a group switching matrix 120 and a control unit 124. The group switching matrix 120 is used for switching voice and data and for connecting signalling circuits. The base station system RNS comprised of the base station 100 and the base station controller 102 also includes a transcoder 122.

The physical structure of base station controller 102 and base station 100, as well as the division of tasks between them, can vary depending on the implementation. Typically, the base station 100 is responsible for the implementation of the radio path in the manner described above. The base station controller 102 typically manages the following: management of radio resources, control of channel switching between cells, power regulation, timing and synchronization, and paging the subscriber terminal.

The transcoder 122 is typically located as close as possible to the Mobile Switching Centre (MSC) 132, as the voice data can then be transmitted in the mobile telephone system's format between the transcoder 122 and the base station controller 102, thus saving transmission capacity. The transcoder 122 converts between the different digital voice coding formats used in the public switched telephone network and the radio telephone network; for example, it can convert from the 64 kbit/s format in the fixed network to another format used in the cellular radio network (for example, 13 kbit/s) and vice versa. The required device will not be discussed here in more detail; it should be noted, though, that no other data but voice will be subject to conversion in the transcoder 122.

The control unit 124 performs call control, mobility management, gathering of statistical information, and signalling.

The core network CN is comprised of the mobile telephone system infrastructure outside UTRAN. Of the device related to circuit-switched transmission in the core network CN, FIG. 1B shows the Mobile Switching Centre 132.

As can be seen in FIG. 1B, the switching matrix 120 can be used to make connections (shown with black circles) into the Public Switched Telephone Network (PSTN) 134 via the mobile switching centre 132, and into the packet transmission network 142, such as a GPRS network. In the public switched telephone network 134, a typical terminal 136 is a conventional telephone or an ISDN (Integrated Services Digital Network) telephone. Packet transmission will be carried out via a data communications network, such as the Internet 146, from a computer connected to the mobile telephone system 148 to a portable computer 152 connected to the subscriber terminal 150. In place of a combination of subscriber terminal 150 and portable computer 152, it is possible to use, for example, a WAP (Wireless Application Protocol) telephone or a device of the Nokia 9110 Communicator type, integrating a mobile communications terminal with a PDA (Personal Digital Assistant).

The connection between packet transmission network 142 and switching matrix 120 will be established by a support node 140 (SGSN=Serving GPRS Support Node). The purpose of the support node 140 is to transfer packets between the base station system and a gateway node (GGSN=Gateway GPRS Support Node) 144, and to keep track of the position of subscriber terminal 150 within its operating area.

The gateway node 144 connects the public packet transmission network 146 with the packet transmission network 142. The Internet Protocol or the X.25 protocol can be used in the interface. By using encapsulation, the gateway node 144 will hide the internal structure of packet transmission network 142 from the public packet transmission network 146, so from the point of view of the public packet transmission network 146, the packet transmission network 142 looks like a subnet; the public packet transmission network 146 can send packets to a subscriber terminal 150 in the subnet and can receive packets from it.

Typically, the packet transmission network 142 is a private network utilizing the Internet Protocol and carrying signalling as well as user data. The structure of the network 142 can vary from operator to operator, including its architecture and protocols below the Internet Protocol layer.

The public packet transmission network 146 can be, for example, the global Internet; a terminal 148 connected to it, for example, a server computer, wants to transmit packets to the subscriber terminal 150.

Figure 1C:
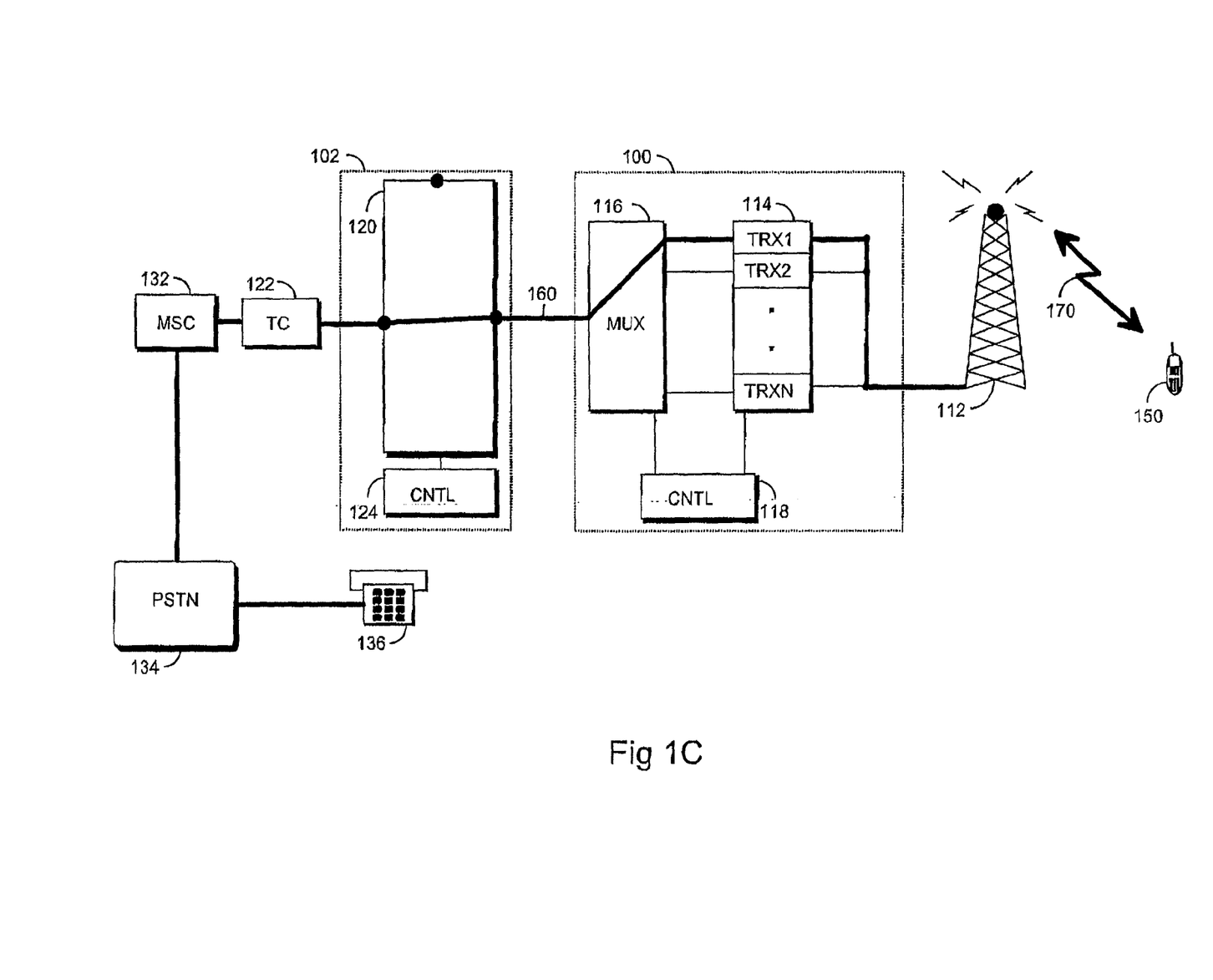
FIG. 1C shows a circuit-switched connection.

FIG. 1C shows how a circuit-switched transmission channel can be established between the subscriber terminal 150 and the public switched telephone network terminal 136. In the figures, an intensified line shows the flow of data through the system in the air interface 170, from the antenna 112 to the transceiver 114, from there multiplexed in the multiplexer 116 through the transmission channel 160 to the switching matrix 120, where a connection has been established to the output going into the transcoder 122, from there via a connection made in the mobile switching centre 132 to the public switched telephone network 134 and its terminal 136. In the base station 100, the control unit 118 controls the multiplexer 116 in performing the transmission, and in the base station controller 102, the control unit 124 controls the switching matrix 120 to make the correct connection.

Figure 1D:
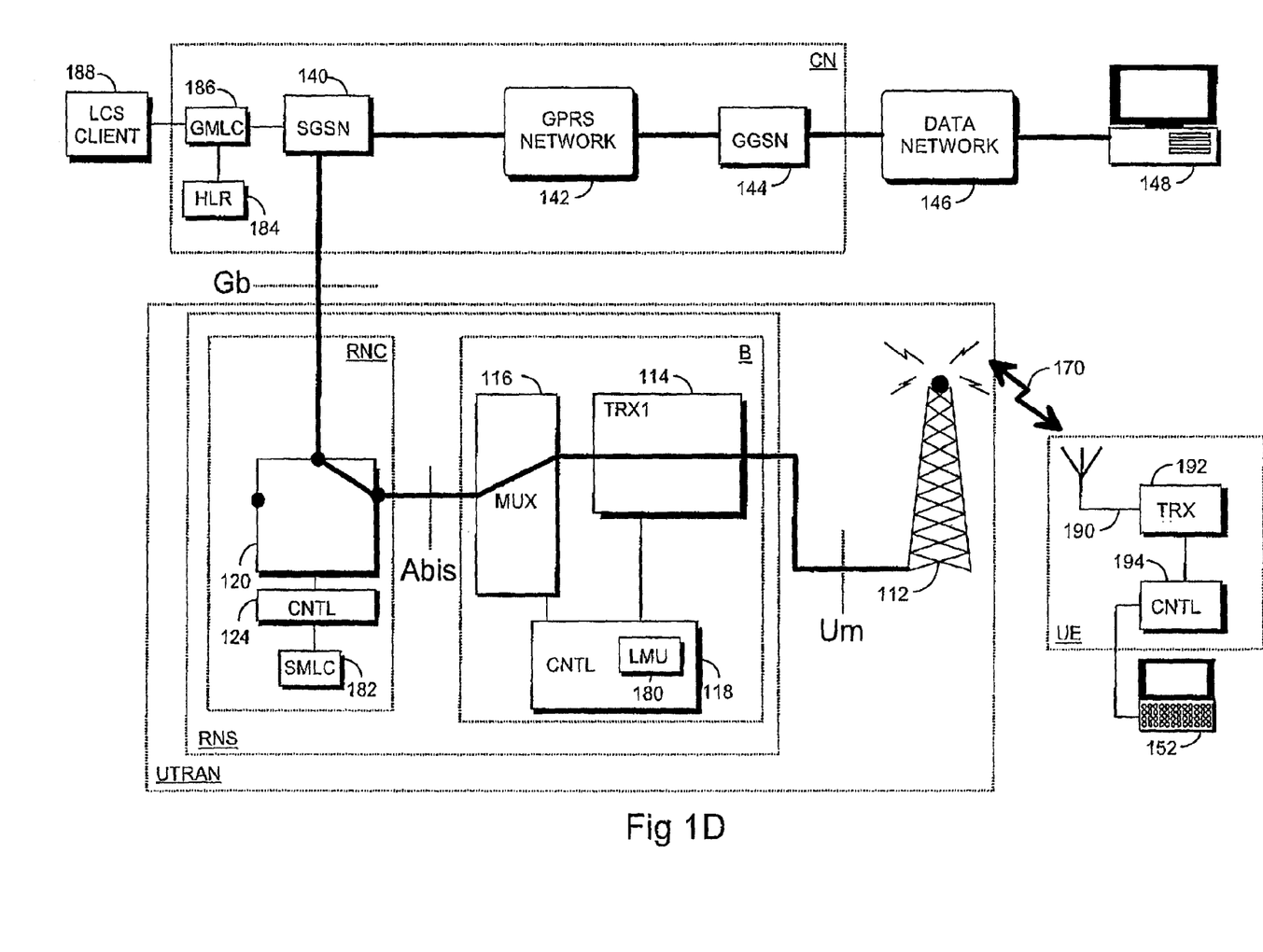
FIG. 1D shows a packet-switched connection.

FIG. 1D shows a packet-switched connection. A portable computer 152 has now been connected to the subscriber terminal UE (reference 150 in FIG. 1B). The intensified line shows the flow of transmitted data from the server computer 148 to the portable computer 152. It is of course possible to transmit data also in the opposite direction, that is, from the portable computer 152 to the server computer 148. The data flows through the system in the air interface, also known as the Um interface 170, from the antenna 112 to the transceiver 114, and from there multiplexed in the multiplexer 116 through the transmission channel (reference 160 in FIG. 1B) in the Abis interface to the switching matrix 120, where a connection has been established to the output going into the support node 140 in the Gb interface; from the support node 140, the data will be transmitted via the packet transmission network 142 through the gateway node 144, connected to the public packet transmission network 146 and its server computer 148.

For clarity, FIGS. 1C and 1D do not show a case where both circuit-switched and packet-switched data is transmitted at the same time. This is, nevertheless, wholly possible and common, as capacity that is not used for circuit-switched transmission can be utilised for packet-switched transmission in a flexible way. It is also possible to construct a network where no circuit-switched data is transmitted; the network is used only for packet-switched data. This makes it possible to simplify the network structure.

Let us take a further look at FIG. 1D. The different entities of the UMTS system—CN, UTRAN, RNS, RNC, B—are outlined in the figure as dashed boxes. The device related to packet-switched transmission in the core network CN will now be described in more detail. In addition to the support node 140, the packet transmission network 142 and the gateway node 144, the core network also includes a Gateway Mobile Location Center (GMLC) 186 and a Home Location Register (HLR) 184.

The purpose of the Gateway Mobile Location Center 186 is to provide location service to an external client 188. The Home Location Register 184 includes subscriber data and routing information for the location service. Additional location service device shown in FIG. 1D includes the Serving Mobile Location Center 182, which can reside in the base station controller RNC as shown, for example in its control component 124; it can also be a separate device connected to either the base station controller RNC or the support node 140.

In addition, a Location Measurement Unit (LMU) 180 is shown; it can reside either in the base station B, for example in its control component 118, or it can be a separate device connected to the base station B. The purpose of the Location Measurement Unit 180 is to perform radio measurements possibly required by the positioning method.

The Location Measurement Unit 180 for subscriber terminals is a network element also known as SMLC (Serving Mobile Location Center).

FIG. 1D also shows the structural parts of the subscriber terminal UE that are relevant to the present application. The subscriber terminal UE comprises an antenna 190, through which the transceiver 192 receives a signal from the radio interface 170. The operations of the subscriber terminal UE are controlled by a control component 194, typically a microprocessor with its required software.

In addition to the components shown here, the subscriber terminal UE also comprises a user interface typically comprised of a loudspeaker, a microphone, a display and a keyboard, as well as a battery. These are not described here in more detail, as they are not relevant to the present invention.

Neither is the structure of the transceiver in base station B, nor the structure of the transceiver in subscriber terminal UE described here in more detail, as the implementation of the said devices is clear to a person skilled in the art. For example, a normal EGPRS-compliant radio network transceiver and subscriber terminal transceiver can be used. The operations related to positioning will be carried out in upper layers of the OSI (Open Systems Interconnection) model, particularly in the third layer.

Figure 2:
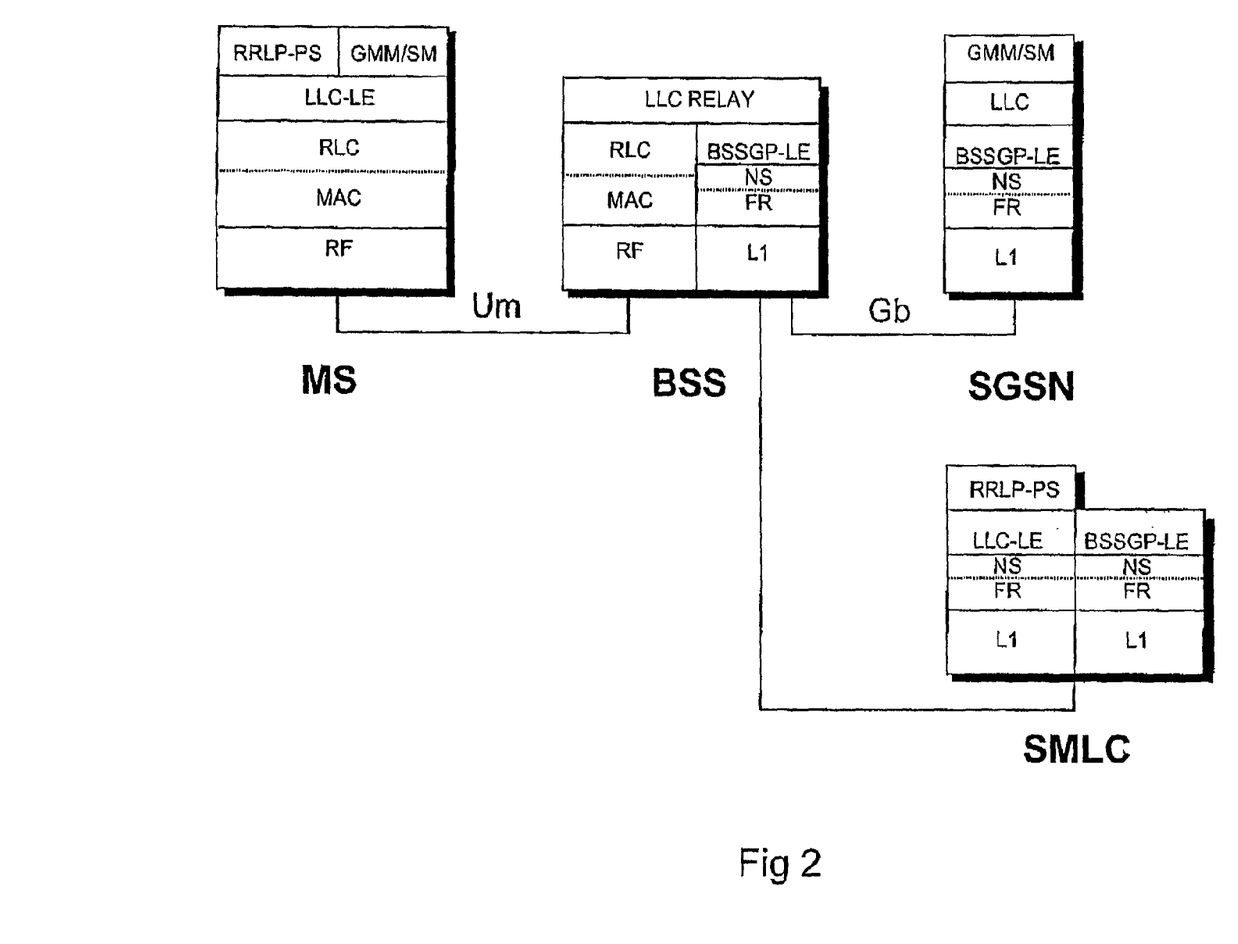
FIG. 2 shows an example of the protocol stacks in specific parts of the cellular radio network.

FIG. 2 shows the protocol stacks of the EGPRS Control Plane as an example. It should be noted that the embodiments are by no means restricted to EGPRS. The protocol stacks have been built according to the ISO (International Standardization Organization) OSI (Open Systems Interconnection) model. In the OSI model, protocol stacks are divided into layers. In principle, there can be seven layers. For each network element, FIG. 2 shows the protocol parts processed in that element. The network elements are the subscriber terminal MS, the base station system BSS, the support node SGSN, and the location centre SMLC. The base station and the base station controller are not shown separately, because no interface has been defined between them. The protocol processing assigned to base station system BSS can thus in principle be freely distributed between the base station 100 and the base station controller 102; in practice, the transcoder 122 can not be used here, even though it is a part of the base station system BSS. The various network elements are separated by their interfaces Um, Gb, and Gn.

The layers in each device MS, BSS, SGSN, and SMLC, will communicate logically with the corresponding layer in another device. Only the lowermost, physical layers will communicate directly with each other. Other layers will always use services provided by the next lower layer. The message must therefore be physically passed vertically between the layers, and only in the lowermost layer (also known as the physical layer), the message will be transmitted horizontally between the layers.

The actual transmission at the bit level will be performed using the lowermost, first layer RF, L1. The physical layer defines the mechanical, electrical and functional features for connecting into the transmission medium in question.

The next, second layer, known as the data link layer, utilises the services of the physical layer to implement reliable communications, performing correction of transmission errors, for example. In the air interface 170, the data link layer is divided into the RLC/MAC sublayer and the LLC sublayer. The third layer, known as the network layer, provides the upper layers with independence of data transmission and switching technologies between the devices.

The network layer is responsible for establishing, maintaining and disconnecting connections. In the GSM system, the network layer is also known as the signalling layer. It serves two main tasks: message routing, and the means to establish several independent, simultaneous connections between two entities. The network layer comprises the Session Management (SM) sublayer and the GPRS Mobility Management (GMM) sublayer.

The GPRS Mobility Management sublayer GMM manages the consequences of subscriber terminal movement that are not directly related to radio resources management. In the fixed network, this sublayer would be responsible for user authentication control and connecting the user to the network. Therefore, in cellular networks this sublayer supports user mobility and registration as well as the management of data resulting from mobility. In addition, this sublayer will verify the identity of the subscriber terminal and the authorised services. Messaging in this sublayer takes place between the subscriber terminal MS and the support node SGSN.

The session management sublayer SM manages all operations related to the management of a packet-switched call, but it does not detect the movement of the user. The session management sublayer SM will establish, maintain, and release the connections. It includes separate procedures for calls originated by the subscriber terminal 150 and calls terminating in it. Messaging in this sublayer also takes place between the subscriber terminal MS and the support node SGSN.

In the base station system BSS, the messages in the session management sublayer SM and the mobility management sublayer GMM are processed transparently, that is, they are only transferred back and forth.

The LLC (Logical Link Control) layer will implement a reliable, encrypted logical link between the SGSN and the MS. The LLC is self-sufficient and independent of the lower layers, to minimise the effect of a modified air interface on the network component of the mobile telephone network. The information to be transmitted, as well as the user data, will be protected by encryption. Between the Um and Gb interfaces, the LLC data will be transmitted in the LLC relaying layer LLC RELAY. The MAC (Medium Access Control) layer is responsible for the following tasks: multiplexing of data and signalling both in the uplink connections (from the subscriber terminal to the network component) and the downlink connections (from the network component to the subscriber terminal), managing uplink resource requests, and the distribution and timing of resources for downlink traffic. Also the handling of traffic priorities is the responsibility of this layer. The RLC (Radio Link Control) layer is responsible for passing the LLC layer data, that is, the LLC frames, to the MAC layer; the RLC splits the LLC frames into RLC data blocks and relays them to the MAC layer. In the uplink direction, the RLC constructs LLC frames from the RLC data blocks and passes these to the LLC layer. The physical layer will be implemented using a radio connection in the Um interface, for example, the air interface defined in the GSM system. The physical layer performs, for example, the carrier modulation, interleaving and error correction for the transmitted data, synchronization, and transmitter power regulation.

The GPRS tunneling protocol GTP (GPRS Tunnelling Protocol) will tunnel the signalling via the backbone network between different SGSN's and GGSN's. If desired, GTP can implement flow control between the SGSN and the GGSN. UDP (User Datagram Protocol) will transmit those data packets in the GTP layer that do not require a reliable link, for example, when using IP (Internet Protocol). In the user level, TCP (Transmission Control Protocol) could also be used; it provides flow control as well as protection against loss and corruption for the packets transmitted through it. Respectively, UDP only provides protection against packet corruption.

IP is the GPRS backbone protocol, its functions including the routing of user data as well as control data. IP can be based on the IPv4 protocol, but later on, the system will be migrated to use the IPv6 protocol. The BSSGP (Base Station Subsystem GPRS Protocol) layer will carry information related to routing and quality of service between the BSS and the SGSN, in addition to upper-layer data. The physical transmission of this information is performed in the FR (Frame Relay) layer. NS (Network Service) will forward the messages according to the BSSGP protocol.

Figure 3:
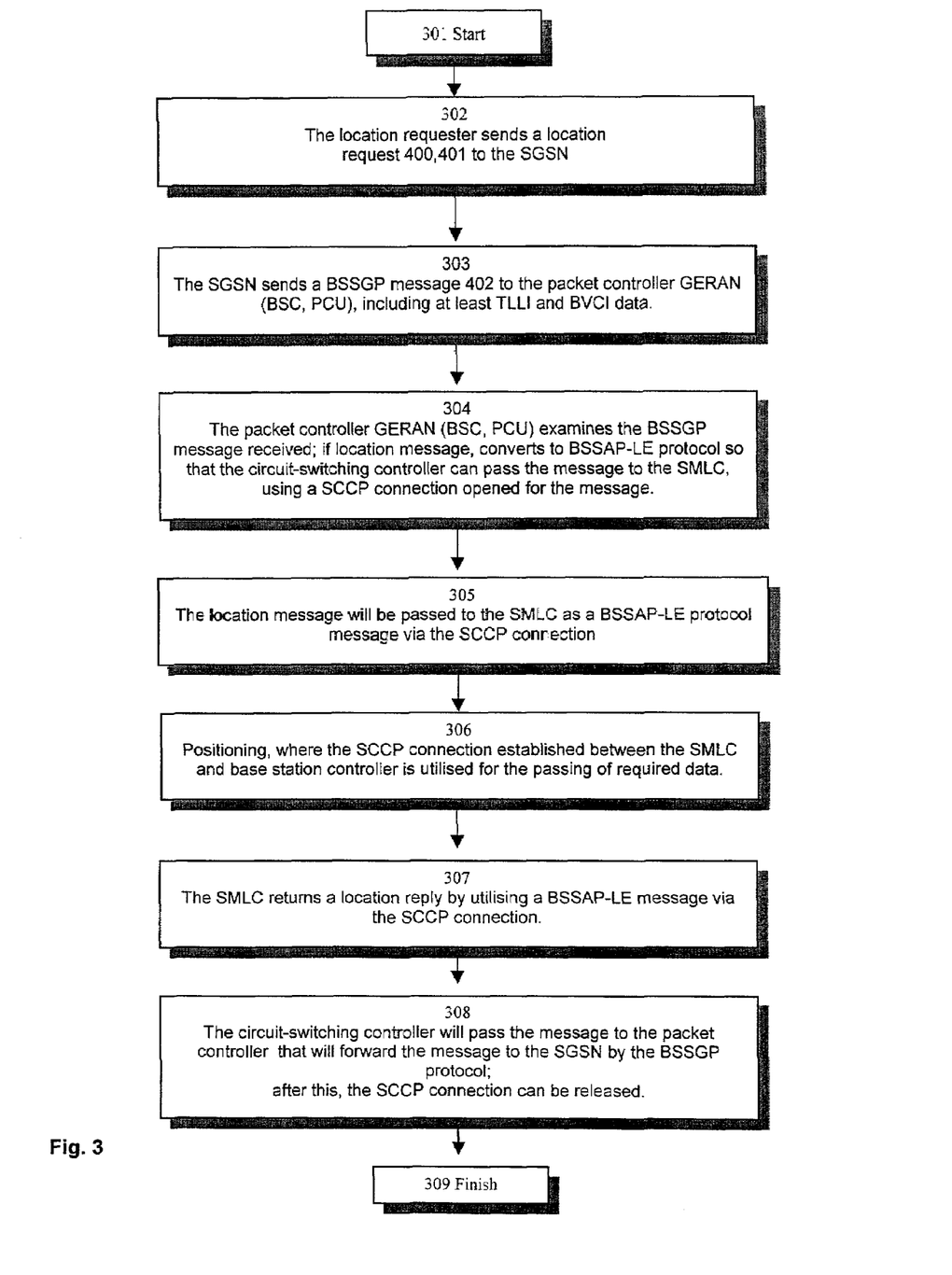
FIG. 3 is a flow chart illustrating the operations performed in the positioning method.
Figure 4:
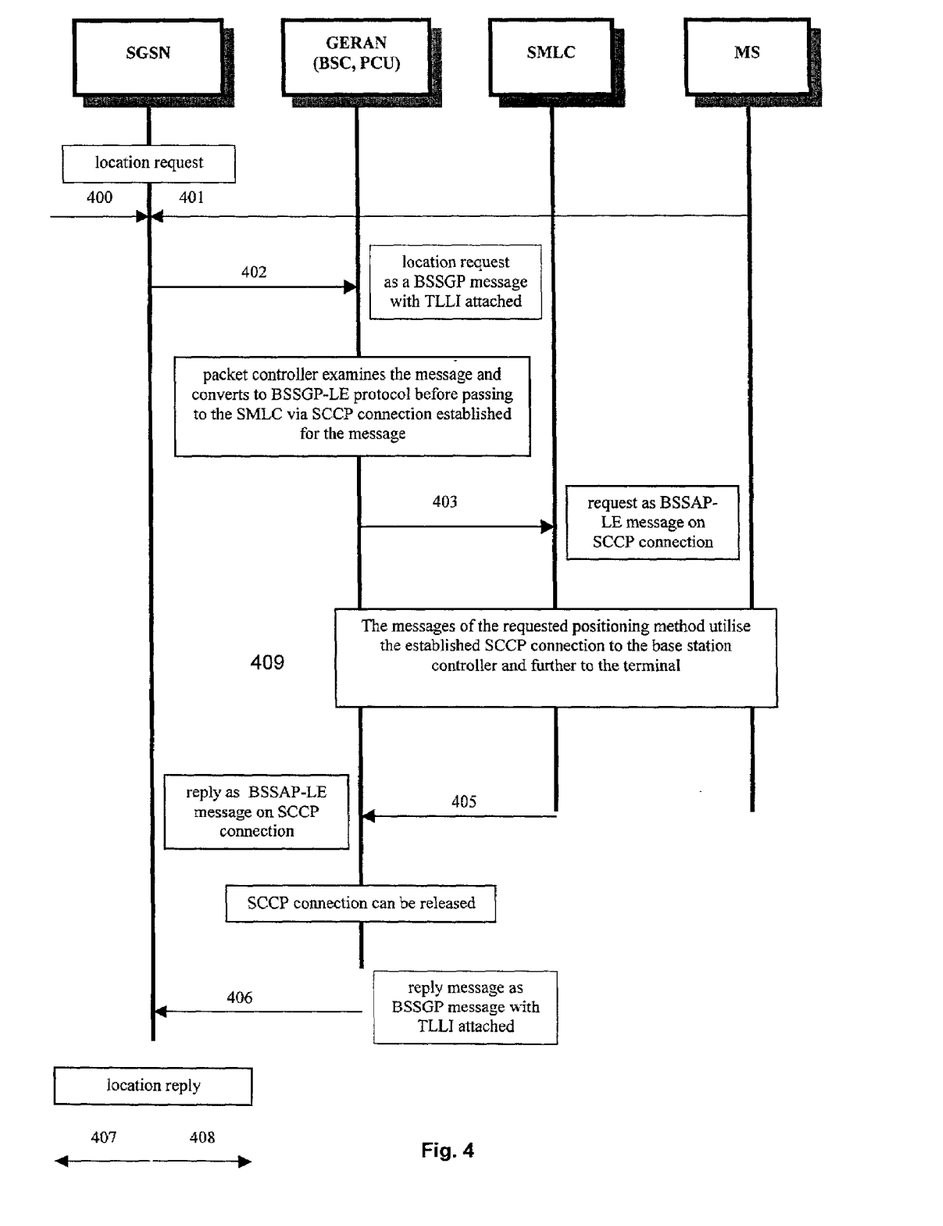
FIG. 4 is a signal sequence chart illustrating the signalling performed in the positioning method.

Next, reference is made to FIGS. 3 to 6, describing the possible signalling of the subscriber terminal positioning method according to the invention, and its possible uses. FIG. 3 is a flow chart illustrating the operations performed in the positioning method, and FIG. 4 is a signal sequence chart illustrating the signalling performed in the positioning method.

It should be noted that the example shown uses operations not yet specified in the stage three description of 3GPP ($3^{rd}$ Generation Partnership Project), so the names used here may be changed in the future.

In addition, for example the SMLC and the base station controller may in practice be integrated in the same device. The method according to the invention should be used even in this case, to facilitate an association-based connection to the desired terminal.

The operation starts from step 301, with a location request in step 302. Such a request 400, 401 may be either a MOLR request 401 from the mobile terminal or a MTLR request 400 from another network element. The operation is the same in both cases.

According to FIG. 4, an internal or external client of the location service, or a mobile terminal MS, requests information on the location of a certain subscriber terminal by sending a location service request 400,401, received by the SGSN. The required routing information to the appropriate SGSN will be obtained from the HLR by means of a special routing information request, acknowledged by the HLR with a routing information acknowledgement. This operation is regarded known, and will not be discussed further. Based on the routing information, the GMLC knows the appropriate SGSN to send the request for subscriber terminal location.

In the next step 303 of FIG. 3, the SGSN in question will send a BSSGP message 402 to the packet controller (that is, the packet-switched functionality PCU of the base station controller GERAN), including at least TLLI (Temporary Logical Link Identity) and BVCI (BSSGP Virtual Connection Identifier) information. The BVCI indicates the cell where the mobile terminal is in operation.

The packet controller PCU examines the BSSGP message 402 received in step 304, and if it is a location message, it will be converted to the BSSAP-LE protocol so that the circuit-switching controller, that is, the circuit-switched functionality BSC of the base station controller GERAN (see FIG. 5) would be able to forward the message 403 further to the SMLC by means of a SCCP connection established for the message 403.

In the next step 305, the location request message 403 will be passed to the SMLC via the SCCP connection, as additional information using the BSSAP-LE protocol.

Through the SCCP connection established in step 306, the SMLC will receive the location request message 403 which includes the said BSSAP-LE message; the SMLC will carry out the location request using the desired method. Because a SCCP connection has been established, the SMLC can initiate communication in the MS direction through the base station controller in step 306, using the SCCP connection. Because the base station controller BSC knows the association between the SCCP connection and the corresponding packet connection by means of the TLLI, it can initiate communication with the appropriate terminal. This communication 409 will be used to implement positioning using the requested method, and the location information or other information related to the location will be returned by means of a BSSAP-LE message through the SCCP connection 405. The information transmitted here is highly dependent on the positioning method used. It is common to the different methods that some kind of a signal is required from the terminal MS (that is, either a signal transmitted over the rf link of the mobile communications network, or, for example, the signal from a GPS transceiver, depending on the positioning method used), to be able to determine its position at the required resolution.

In step 307, the circuit-switching controller BSC will pass a message to the packet controller PCU which will forward the message 406 to be transmitted further by the BSSGP protocol to the SGSN. After this, the SCCP connection can be released. When the SGSN has forwarded the returned information 407,408 to the requester, operation will end in step 309.

Figure 5:
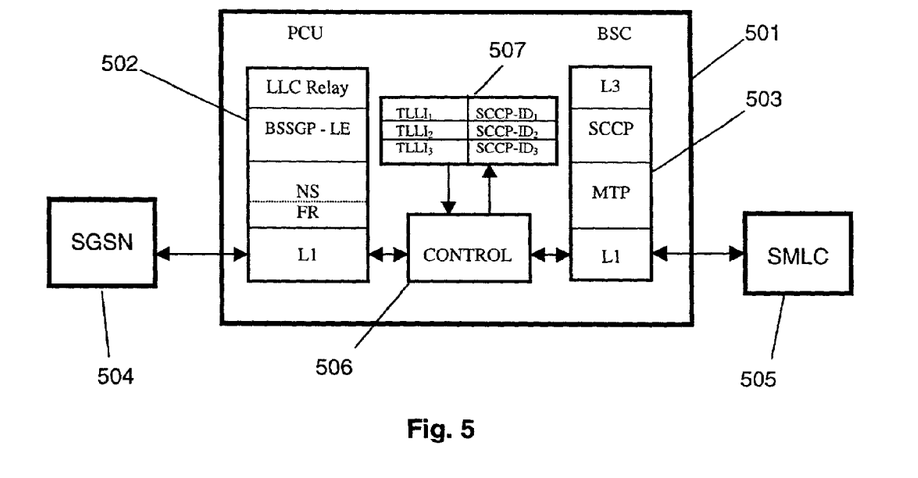
FIG. 5 shows a block diagram of the implementation of base station controller according to the invention.

FIG. 5 shows a coarse block diagram of the base station controller to implement the association according to the invention. A GERAN (BSC, PCU) base station controller 501 according to the invention comprises a protocol stack 502 for packet-switched functionality and a protocol stack 503 for circuit-switched functionality. Using the packet-switched protocol stack 502, the base station controller communicates with the SGSN 504, and using the circuit-switched protocol stack 503, the base station controller communicates with the SMLC location server 505.

The base station controller 501 also communicates with the mobile station MS through the air interface Um, but for clarity, this is not shown in FIG. 5.

The control unit 506 controls the association, and thus the packet-switched and circuit-switched communications in the base station controller, records the identification data (or the whole location message) of packet-switched and circuit-switched messages related to a certain connection into the storage device 507 to establish the association, and transmits the messages to a corresponding layer in another protocol stack after the association has been found. The association storage 505 stores the required information, that is, the whole location message or its identification data; for packet-switched connections, this is the TLLI corresponding to a specified LCS message, and for circuit-switched connections, this is the SCCP Connection ID, for example. This can be implemented as a table, for example (as shown in the figure), where each packet-switched connection identifier TLLI1, TLLI2, TLLI3 and so on corresponds to a circuit-switched connection identifier SCCP-ID$_1$, SCCP-ID$_2$, SCCP-ID$_3$ and so on. When the location return message is received, it can be directed (that is, modified by including the appropriate identifier and converting to a packet-switched or, respectively, a circuit-switched message) using the data in the association storage 507, to be transmitted to another protocol stack and the appropriate recipient.

Figure 6:
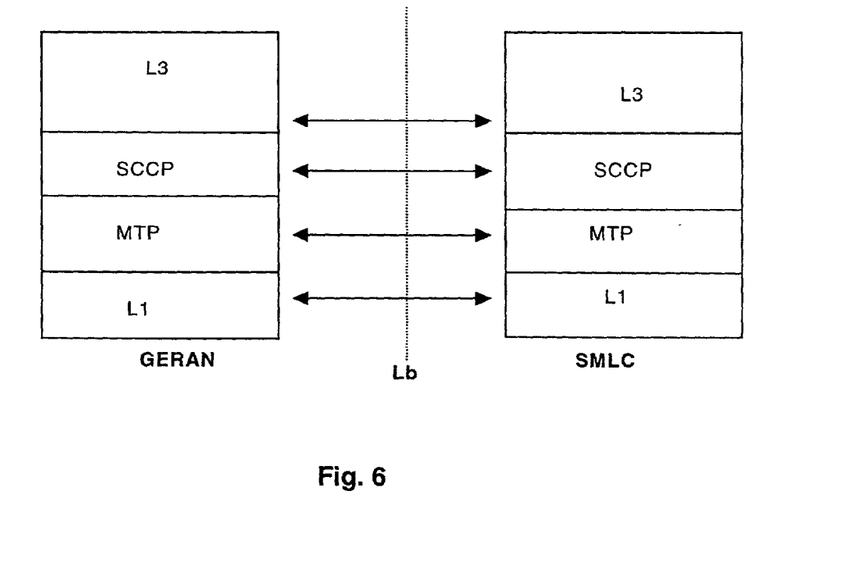
FIG. 6 shows the circuit-switched protocol signalling over the Lb interface according to the invention.

FIG. 6 shows a connection according to the invention over the Lb interface using the SS7 protocol. L1, or the first layer, is the physical layer, and the MTP protocol layer is used for transmission of messages between the location centre SMLC and the base station controller BSC (that is, the circuit-switched base station controller functionality of the base station controller GERAN). The SCCP layer implements a virtual connection between the corresponding layers. The preferred implementation of the third layer L3 is according to the BSSAP-LE protocol, and it will serve as the transmission protocol for the application layers.

In another embodiment of the invention, the location centre SMLC is integrated with the base station controller GERAN. Even in this case, the preferred location of the location centre is in the circuit-switched functionality of the base station controller, still implementing the association according to the invention inside the base station controller.

The preferred method of implementing new features compared to prior art is software-based, which means that the positioning method will require relatively simple software modifications to clearly defined functions in the network component of the radio system and the location server.

In a preferred embodiment, the protocol stack on the packet-switched side of the network comprises software-based means for detecting the location message received from the packet-switched network and for converting this message to be forwarded in the circuit-switched network, under a circuit-switched protocol, to the appropriate terminal; respectively, the protocol stack on the circuit-switched side of the network comprises software-based means for detecting the location message received from the circuit-switched network and for converting this message to be forwarded in the packet-switched network, under a packet-switched protocol, with the appropriate packet identifier.

In addition, the base station controller according to the invention comprises means for transmitting a message from the packet-switched network side to the circuit-switched network side and vice versa.

The SCCP connection established for the positioning can be effectively utilised in implementing the positioning method, and the connection can be released after giving the location response.

Even though the invention has been presented above with reference to the example in the enclosed figures, it is clear that the scope of the invention is not limited to this example, but this software-based implementation can be modified in many ways in the framework outlined by the following patent claims.

What is claimed is:

1. A method for positioning a subscriber terminal in a packet-switched mobile telephone network comprising:
    passing a message for positioning the terminal via a network element of the mobile telephone network that is configured for both circuit-switched and packet-switched messages for implementing communications required for the positioning;

establishing an association between the circuit-switched and packet-switched messages for transferring data relating to a certain positioning between packet-switched and circuit-switched functionality; and using a circuit-switched connection between the network element and a location centre.

2. A method according to claim 1, wherein the data related to a certain positioning is data related to a certain location request.

3. A method according to claim 1, wherein the data related to a certain positioning is data related to the positioning of a certain subscriber terminal.

4. A method according to claim 1, wherein the determination of position is carried out by a location centre wherein connections in the mobile telephone network, other than said connection between said network element and the location centre, are packet-switched connections.

5. A method according to claim 4, wherein a core network element of the mobile telephone network will pass the location request to the network element in packet-switched form with a packet identifier to establish a circuit-switched connection.

6. A method according to claim 1, wherein
said association is established by correlating a packet-switched message identifier with a circuit-switched message identifier.

7. A method according to claim 6, wherein the packet-switched message is converted into a message that can be forwarded under a circuit-switched protocol.

8. A method according to claim 6, wherein the circuit-switched message is converted into a message that can be forwarded under a packet-switched protocol.

9. A method according to claim 1, wherein the packet-switched functionality comprises a packet-switched protocol.

10. A method according to claim 1, wherein the circuit-switched functionality comprises a circuit-switched protocol.

11. A method according to claim 4, wherein the connection between the network element and the location centre is performed over an Lb interface using SS7 protocol.

12. A system for positioning a subscriber terminal in a packet-switched mobile telephone network comprising:
a core network element, base stations, a base station controller controlling the base stations, and a mobile terminal of the mobile telephone network, wherein connections in the mobile telephone network are configured as packet-switched connections,
wherein the system comprises:
a location unit for determining the position of the terminal, functionally connected with the a network element of the mobile telephone network, wherein a connection between the network element and the location unit is configured as a circuit-switched connection, and wherein the network element comprises:
both circuit-switched and packet-switched functionality for processing circuit-switched and, respectively, packet-switched messages,
the network element being arranged to establish an association between the circuit-switched and the packet-switched functionality for the transmission of data related to a specific positioning between the packet-switched and the circuit-switched functionality.

13. A system according to claim 12, wherein the circuit-switched functionality comprises a circuit-switched protocol stack, and the packet-switched functionality comprises a packet-switched protocol stack.

14. A system according to claim 12, wherein the network element is arranged to convert a packet-switched message into a circuit-switched message.

15. A system according to claim 12, wherein the network element is arranged to convert a circuit-switched message into a packet-switched message.

16. A system according to claim 12, wherein there is an Lb interface between the network element and the location unit, and the communications over said Lb interface are arranged to be conducted using SS7 protocol.

17. A system according to claim 12, wherein the system comprises obtaining of a signal from the terminal in order for the location unit to be able to determine the position of the terminal.

18. A network element of a packet-switched mobile communications system wherein
the network element is arranged to implement circuit-switched functionality for processing circuit-switched messages and packet-switched functionality for the processing of packet-switched messages; and wherein
the network element is arranged to establish an association between the circuit-switched and the packet-switched functionality for the transmission of data related to a specific positioning between the packet-switched and the circuit-switched functionality; and wherein
the network element is arranged for circuit-switched communication with a location unit.

19. A network element according to claim 18, wherein the network element is arranged to
establish a packet-switched connection to core network of the mobile communications system, and wherein
the network element is arranged to process communications related to positioning of a mobile communications terminal and to associate packet-switched and circuit-switched positioning communications with each other.

20. A method according to claim 1, wherein said network element is a network element belonging to a base station system of the mobile telephone network.

21. A method according to claim 1, wherein said network element is a base station controller.

22. A system according to claim 12, wherein said network element is a network element belonging to a base station system of the mobile telephone network.

23. A system according to claim 12, wherein said network element is the base station controller.

24. A network element according to claim 18, wherein said network element is a network element belonging to a base station system of the mobile communications system.

25. A network element according to claim 18, wherein said network element is a base station controller.

* * * * *